(No Model.)

K. F. LAGERGREN.
CRANK FASTENING DEVICE.

No. 540,448. Patented June 4, 1895.

WITNESSES:
E. B. Bolton
H. Van Oldenneel

INVENTOR
Karl Trombold Lagergren
BY
Richardson
ATTORNEYS

THE NORRIS PETERS CO., PHOTO-LITHO., WASHINGTON, D. C.

UNITED STATES PATENT OFFICE.

KARL FROMHOLD LAGERGREN, OF STOCKHOLM, SWEDEN.

CRANK-FASTENING DEVICE.

SPECIFICATION forming part of Letters Patent No. 540,448, dated June 4, 1895.

Application filed September 6, 1894. Serial No. 522,259. (No model.)

*To all whom it may concern:*

Be it known that I, KARL FROMHOLD LAGERGREN, cashier, a subject of the King of Sweden and Norway, and a resident of 83 Grefthuregatan, Stockholm, Sweden, have invented certain new and useful Improvements in Crank Fastening Devices Specially Adapted for Cycles, of which the following is a specification, reference being had therein to the accompanying drawings.

This invention relates to improvements in the fixing of cranks or rocking arms to shafts specially adapted for cycles. The usual mode of fixing the pedal cranks of a cycle to the axle consists in fitting a taper bolt or cotter in a transverse groove in the axle, this bolt traversing the head of the crank and being retained by a nut, on the end of the axle. The great weakening of the axle produced by this way of fixing has the inconvenience that the axis is often broken off at the transverse groove. My invention has for its object to prevent this inconvenience, and, at the same, to produce a more secure connection between the axle and the crank.

Figure 1:
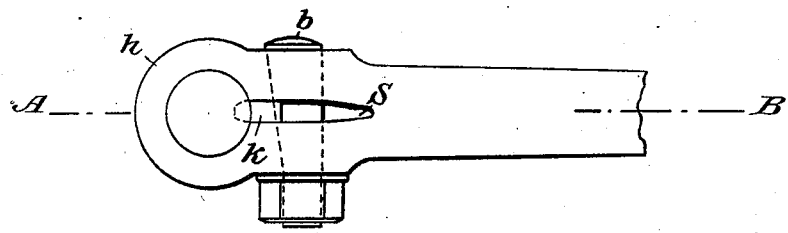
Figure 2:
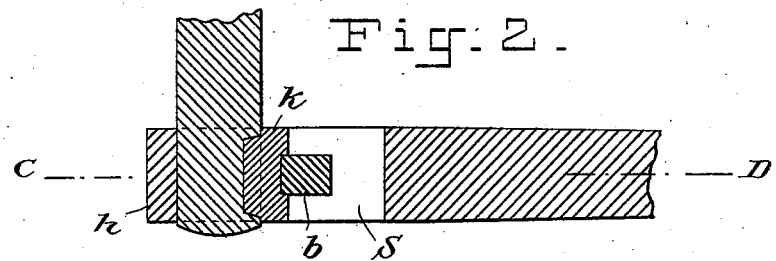
Figure 3:
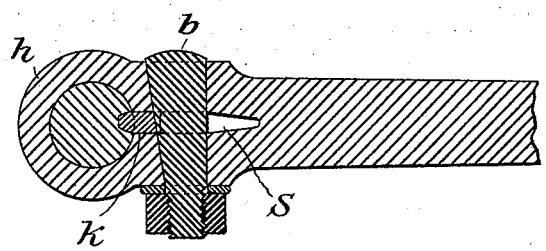
Figure 4:
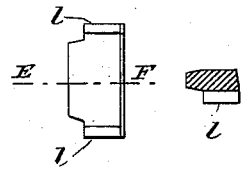

Figure 1 shows this arrangement in side elevation, while Figs. 2 and 3 show sections taken, respectively, on the lines A B of Fig. 1 and C D of Fig 2. Fig. 4 is an elevation and section of a modified form of the key *k*.

Through the crank head *h* is made an opening *s* for the key *k*. This opening is somewhat prolonged in the direction of the crank for facilitating the eye of the crank clasping the axle more securely. In the axle is made a corresponding groove or recess for the key *k*. This groove either extends to the end of the axle as an ordinary key groove or as shown in Fig. 2 terminates near the end of the axle so as to leave a portion which prevents the key from shifting in the longitudinal direction of the axle. The key is pressed into its groove or recess and against the axle by means of a taper bolt or cotter *b* crossing the key and extending through the crank-head. The bolt or cotter *b* is retained either by a pin or fork in or on its smaller end or as shown on the drawings (Figs. 1 and 3) by a nut on its threaded end. When tightening the nut the eye is pressed around the axle thereby securing a very strong connection between the axle and the crank. At the same time the slight reduction of the cross section of the axle leaves it substantially in possession of its full strength.

For a complete locking in the longitudinal direction of the axle a groove may be made on the outer side of the key *k* as shown in Fig. 2 in which groove is fitted the taper bolt or cotter *b;* or the key *k* may be provided with projections *l* for the ends (Fig. 4) these projections abutting against the outer and inner side of the crank.

Having now described my invention, what I claim as new, and desire to secure by Letters Patent, is—

1. In combination with the shaft, the crank having the slit extending lengthwise thereof, the key in said slit engaging the shaft and the taper bolt passing through the crank and bearing on the key to force the same against the shaft, said taper bolt acting also to clamp the two sides of the crank about the shaft, substantially as described.

2. In combination, the shaft, the crank having the slit *s*, the key in the said slit, said key having shoulders *z* to bear on the side of the crank, and the bolt passing through the crank transversely of the key and bearing thereon substantially as described.

In witness whereof I have hereunto signed my name in the presence of two subscribing witnesses.

KARL FROMHOLD LAGERGREN.

Witnesses:
ERNST SVANQUIST,
HANS B. OHESSON.